(12) United States Patent
Lee

(10) Patent No.: US 6,543,179 B1
(45) Date of Patent: Apr. 8, 2003

(54) ANIMAL TRAP

(76) Inventor: Chang Soon Lee, 1519 11$^{th}$ St., Fort Lee, NJ (US) 07024

( * ) Notice: Subject to any disclaimer, the term of this patent is extended or adjusted under 35 U.S.C. 154(b) by 0 days.

(21) Appl. No.: 09/970,753

(22) Filed: Oct. 4, 2001

(51) Int. Cl.$^7$ .................. A01M 23/20; A01M 23/02; A01M 23/04
(52) U.S. Cl. .................................. 43/61; 43/60
(58) Field of Search ............... 43/61, 62, 65, 43/69, 58, 60, 67, 70

(56) References Cited

U.S. PATENT DOCUMENTS

| | | | |
|---|---|---|---|
| 26,883 A | | 1/1860 | Buttles |
| 665,847 A | * | 1/1901 | Barton .................. 43/61 |
| 690,171 A | | 12/1901 | Mills |
| 904,348 A | | 11/1908 | Moore |
| 1,077,064 A | | 10/1913 | Hamann |
| 1,741,429 A | | 12/1929 | Orgill |
| 2,129,594 A | * | 9/1938 | Shimamoto ............... 43/61 |
| 2,235,483 A | | 3/1941 | Jacobs |
| 3,975,857 A | | 8/1976 | Branson et al. |
| 4,142,320 A | * | 3/1979 | Marcolina et al. ........... 43/61 |
| 4,173,092 A | | 11/1979 | Nakai |
| 4,232,472 A | * | 11/1980 | Muelling ................. 43/61 |
| 4,413,439 A | | 11/1983 | Lindley |
| 4,829,701 A | * | 5/1989 | ImBrogno ................ 43/61 |
| 5,345,710 A | * | 9/1994 | Bitz .................... 43/61 |
| 5,501,031 A | * | 3/1996 | Heilesen ................. 43/61 |

FOREIGN PATENT DOCUMENTS

FR          2709044 A1  *  2/1995  .......... A01M/23/18

* cited by examiner

*Primary Examiner*—Charles T. Jordan
*Assistant Examiner*—Tara M Golba
(74) *Attorney, Agent, or Firm*—Richard M. Goldberg

(57) ABSTRACT

An animal trap includes a housing having a bottom wall, side walls, a top wall and a front opening in the side walls, opposing slots in the side walls adjacent the opening, and opposing channels in the side walls immediately behind the slots; a door slidably mounted in the slots for movement between raised and lowered positions to unblock and block the opening; a platform pivotally positioned on the bottom wall; levers pivotally mounted to the side walls adjacent the opening, each having a front end catch for engaging a lower end of the door to hold the door in the raised position, and a rear end; and lifters slidably guided by the channels for vertical movement between the rear end of the lever and one end of the platform, to cause pivoting of the levers and closing of the door upon pivoting of the platform.

10 Claims, 3 Drawing Sheets

ANIMAL TRAP

BACKGROUND OF THE INVENTION

The present invention relates generally to animal traps, and more particularly, is directed to an automatic animal trap which does not require any spring mechanism.

Generally, animal traps are known which use a door that is spring loaded. When the animal steps inside the trap and trips a lever, the spring mechanism automatically snaps the door shut, thereby trapping the animal. However, the use of a spring mechanism makes the trap fairly complicated in construction and more costly. Also, depending upon how fast the spring mechanism shuts the door, the animal can be injured, or alternatively, the spring mechanism can fail, thereby defeating the purpose of the trap. In addition, setting of the spring mechanism can be tricky and can also be prematurely activated when a person is setting up the trap. For this reason, it is considered better to provide an automatic animal trap without a spring mechanism.

In this regard, various animal traps are provided with pivoted platforms on the floor bottom. Initially, the platform is pivoted down toward the front opening. When the animal moves into the trap and rearwardly on the pivoted platform, the platform pivots on a pivot pin so that the rear portion of the platform pivots downwardly. Through various linkage mechanisms, this pivoting movement serves to control closing of the front door, thereby closing the front opening and trapping the animal.

In some of the arrangements, the front door is vertically oriented and is held in a vertically raised position by a mechanism, and when released, falls down by gravity.

For example, U.S. Pat. No. 26,883 to Buttles discloses an animal trap having a pivoted platform and a front door which is held by a pin in the raised position. When the animal crosses to the rear of the platform, and causes pivoting thereof, upright bars positioned on the front of the platform knock the front door off of the pin, so that the front door closes. However, the pin is set in a small opening in the front door and only extends slightly therein. Thus, the front door is precariously held, such that it can easily be accidentally knocked off of the pin. As a result, the front door will fall by gravity to close the opening. Because of this precarious hold by the pin, the front door can therefore fall at a time when there is no animal inside the cage. Therefore, this device is not very reliable.

U.S. Pat. No. 904,348 to Moore discloses another arrangement with a pivoted bottom platform. In this patent, a setting bar extends through a slot in the front door to hold the front door in place in the raised setting position. When the animal moves to the rear of the pivoted platform, the platform pivots about a pivot pin. As a result, the setting bar disengages from the front door, so that the front door falls down by gravity.

U.S. Pat. No. 2,235,483 to Jacobs discloses an animal trap with a pivoted bottom platform. When an animal steps on the back of the platform, a pivoted angle shaped lever at the rear of the enclosure and connected with the rear of the pivoted platform, pivots about another pivot pin. This latter pivoting action triggers a lever to release the front door so that the front door will drop vertically down by gravity.

Other arrangements use a front door that is pivoted at its upper end. In the set position, the front door is pivoted up and held by a mechanism. When released, it pivots down by gravity.

U.S. Pat. No. 1,077,064 to Hamann discloses an animal trap with a front door that is hinged at the upper wall of the trap, along with a trip mechanism at the bottom.

U.S. Pat. No. 1,741,429 to Orgill discloses an animal trap having a front door hinged at the upper edge of the front opening and held in the open position by a latch. When an animal walks to the back of the trap, it steps on the trip plate. This causes a yoke to swing the arm and thereby disengage the latch so as to free the front door and allow it to drop by gravity.

U.S. Pat. No. 690,171 to Mills discloses an animal trap having a pivoted front door which is pivoted at an upper pivot point and has a lip extension which holds the front door in the raised position. When an animal enters and moves the front door upwardly, the lip extension is also pivoted and releases the front door.

U.S. Pat. No. 3,975,857 to Branson et al discloses an animal trap having a pivoted bottom platform which is pivoted about a pivot pin. The front door is hinged at the upper end of the front opening and a linkage mechanism connects the two so that an animal stepping on the rear of the pivoted platform causes the linkage mechanism to release the front door and allow it to swing down and shut the trap.

U.S. Pat. No. 4,173,092 to Nakai discloses an animal trap with a door pivoted at its upper end. There is no pivoted platform on which the animal steps.

U.S. Pat. No. 4,413,439 to Lindley discloses an animal trap also with a door pivoted at its upper end. However, there is again no pivoted platform on which the animal steps.

All of the aforementioned mechanisms are relatively complex in construction and may not be entirely satisfactory in operation.

OBJECTS AND SUMMARY OF THE INVENTION

Accordingly, it is an object of the present invention to provide an animal trap that overcomes the problems with the aforementioned prior art.

It is another object of the present invention to provide an animal trap that eliminates the need for any spring mechanism.

It is still another object of the present invention to provide an animal trap in which the front door closes by means of gravity.

It is yet another object of the present invention to provide an animal trap that uses a pivoted bottom platform to trip a lever positioned adjacent the front opening and which holds the front door in the raised position.

It is a further object of the present invention to provide an animal trap in which the lever securely holds the front door in the raised position when the animal trap is set.

It is a still further object of the present invention to provide an animal trap in which the mechanism for moving the lever to actuate the front door is positioned adjacent the front door and is thereby very close to the front lever.

It is a yet further object of the present invention to provide an animal trap that is easy and economical to use and manufacture.

In accordance with an aspect of the present invention, an animal trap includes a housing having a bottom wall, at least one side wall, an opening in the at least one side wall, opposing first guides in the at least one side wall adjacent the opening, and a second guide in the at least one side wall immediately behind one the first guides. A door is slidably mounted in the opposing guides for movement between a raised position which permits access to the housing through the opening and a lowered position which prevents access to and egress from the housing through the opening, and a platform is pivotally positioned relative to the bottom wall. A lever is pivotally mounted to the at least one side wall adjacent the opening, the lever having a front end with a catch for engaging a lower end of the door to hold the door in the raised position, and a rear end. Further, a lifter is slidably guided by the second guide for vertical movement between the rear end of the lever and one end of the platform, such that pivotal movement of the platform when an animal steps on an opposite end of the platform causes the lifter to move vertically up in the second guide to engage the rear end of the lever so as to pivot the lever, thereby releasing the door from the catch and such that the door falls by gravity to the lowered position to prevent access to and egress from the housing through the opening.

The first guides are formed by vertically oriented slots in the at least one side wall, and the door is slidably mounted for vertical movement in the slots. The second guide includes a vertically oriented channel and the lifter is slidably guided for vertical movement in the vertically oriented channel. Preferably, there are two second guides in opposing relation to each other, and one lifter slidably guided for vertical movement in each vertically oriented channel. In such case, there are two levers pivotally mounted to the at least one side wall adjacent the opening in opposing relation to each other, with one lifter associated with each lever.

The front end of the lever extends downwardly at an angle relative to the rear end of the lever. The catch is formed as an extension of the front end of the lever, and has an upper surface for holding the front door in the raised position. The housing further includes a top wall.

The above and other objects, features and advantages of the invention will become readily apparent from the following detailed description thereof which is to be read in connection with the accompanying drawings.

DETAILED DESCRIPTION

Figure 1:
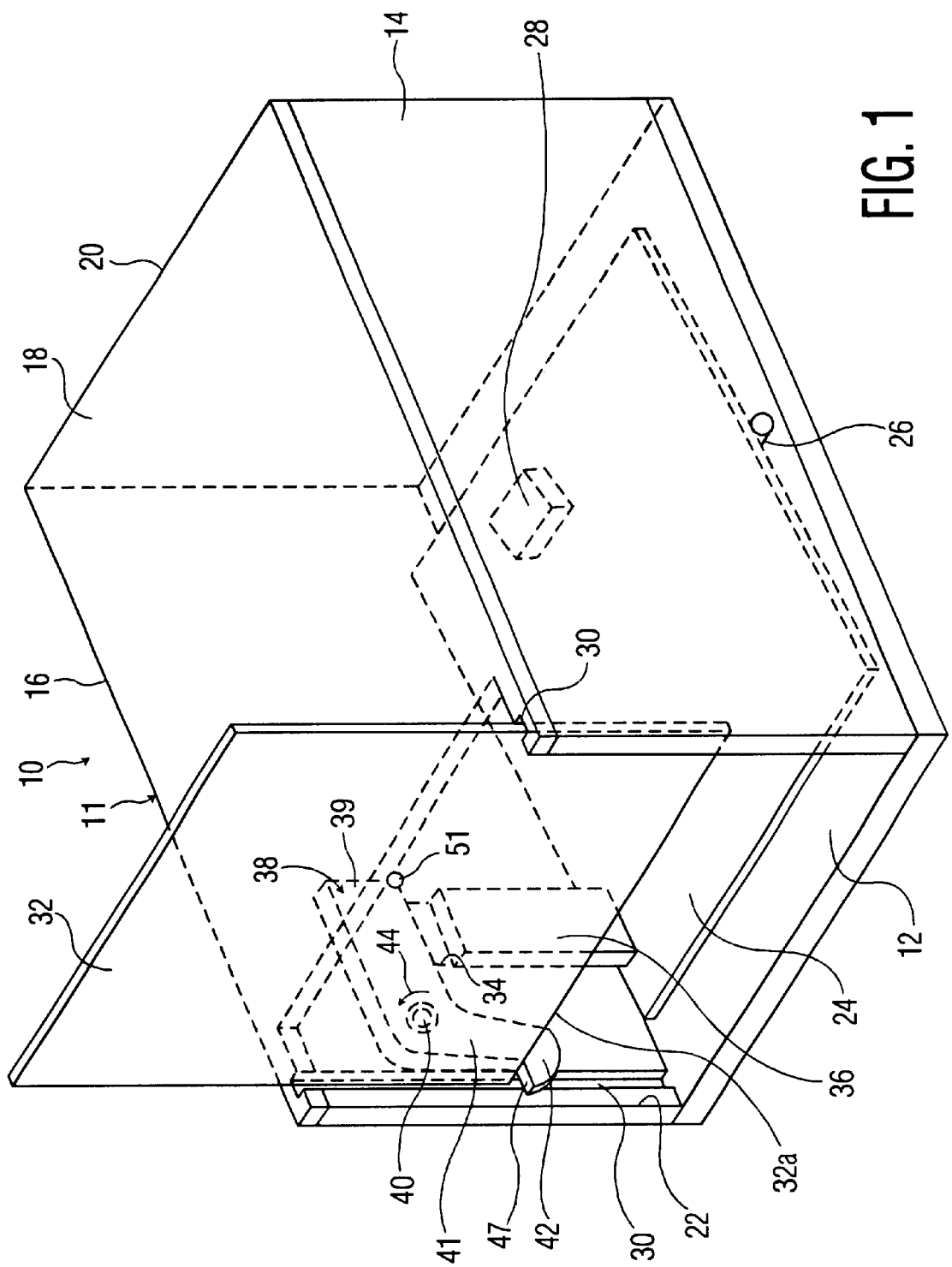
FIG. 1 is a perspective view of an animal trap according to the present invention.
Figure 2:
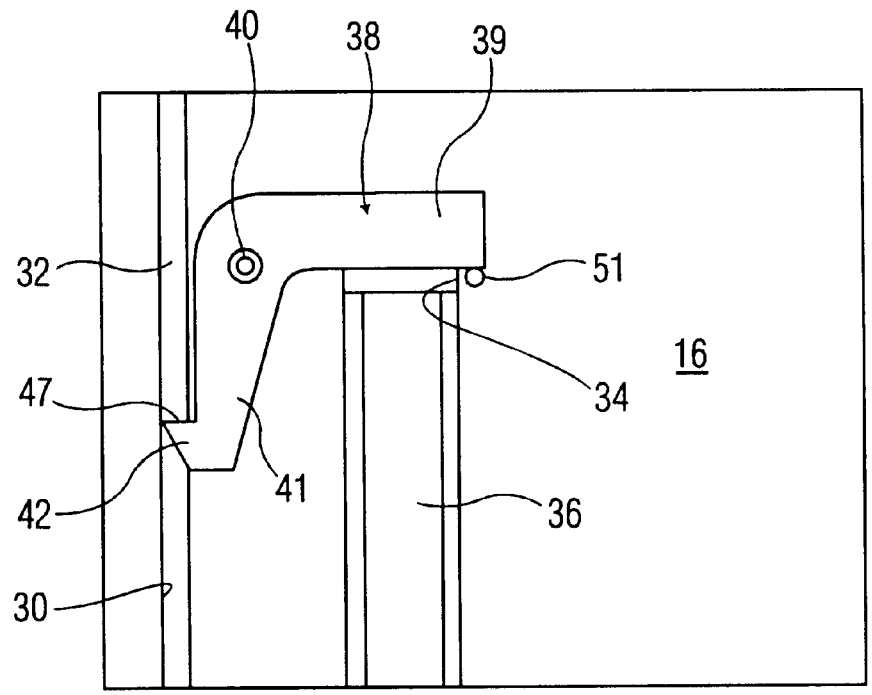
FIG. 2 is an elevational view of the left side wall of the animal trap with the lever and lifter therein.
Figure 3:
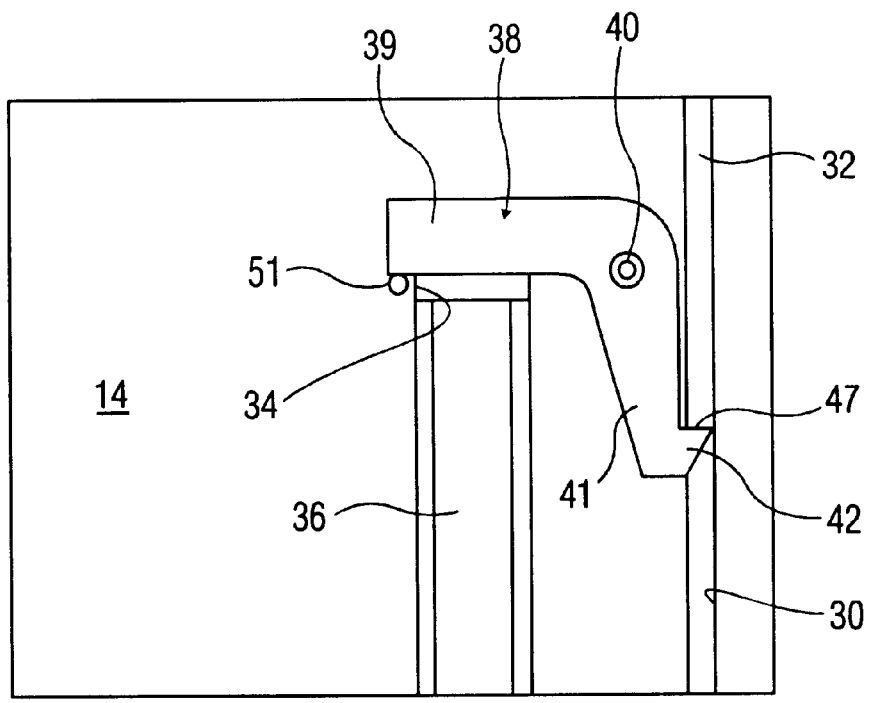
FIG. 3 is an elevational view of the right side wall of the animal trap with the lever and lifter therein.
Figure 4:
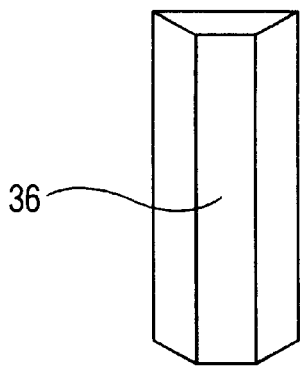
FIG. 4 is an elevational view of one lifter of the animal trap, with the other lifter being identical.

Referring to the drawings in detail, an animal trap 10 according to the present invention includes a housing 11 formed by a bottom wall 12, side walls 14 and 16, a top wall 18 and a rear wall 20, with the front end provided with a front opening 22. A seesaw or pivoted platform 24 is positioned on bottom wall 12 and is supported at its center by a pivot pin or rod 26. The set position is shown in FIG. 1. Food 28 to trap the animal is provided on the raised rear end of platform 24, adjacent rear wall 20.

The inner surface of each side wall 14 and 16 is provided with a vertical slot 30 adjacent front opening 22 and opposing each other. A closing front door 32 is slidably mounted for vertical movement in slots 30, and thereby, slots 30 function as guides for front door 32. Further, a vertical channel 34 is provided on the inner surface of each side wall 14 and 16 in opposing relation to each other, and positioned just rearwardly of the respective slots 30. An elongated rectangular lifter 36 is positioned for vertical slidable movement in each channel 34, with the bottom edge of each lifter 36 resting on platform 24, as shown in FIG. 1. Thus, channels 34 function as guides for lifters 36.

A lever 38 is pivotally mounted by a pivot pin 40 to the inner surface of each side wall 14 and 16, at a position between the respective slot 30 and channel 34. Specifically, each lever 38 includes a substantially rectangular engagement portion 39, the rear portion of which is positioned at the upper end of the respective channel 34 above the lifter 36 therein. Lever 38 further includes an angled portion 41 as a continuation of engagement portion 39 and at an angle thereto. A catch 42 is formed at the front end of inclined portion 41 and is formed as a forward extension with an upper surface 47 for supporting the lower edge 32a of front door 32 thereon. It will be appreciated that angled portion 41 can extend at any suitable angle to engagement portion 39 in FIG. 1.

Figure 5:
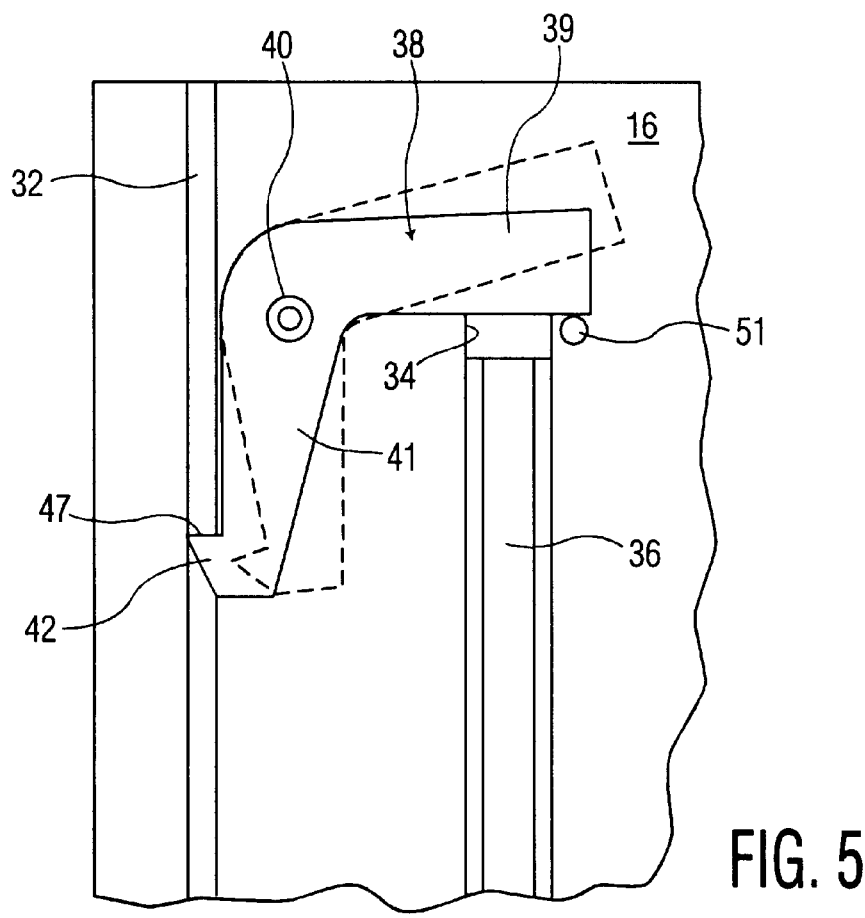
FIG. 5 is an enlarged elevational view showing operation of a lifter actuating a lever to release the front door.

As shown in FIGS. 1 and 5, when front door 32 is raised, levers 38 are pivoted about pivot pins 40 so that the lower edge 32a of closing door 32 rests on upper surfaces 47 of catches 42. In this position, the lower edges of engagement portions 39 rest on pins 51 extending from the inner surfaces of side walls 14 and 16. Because of the pivot position of pivot pins 40, and because of the weight distribution of levers 38, levers 38 remain in this holding position so as to hold front door 32 in the raised position, and thereby provide access through front opening 22 to the inside of housing 11.

In operation, when an animal enters housing 11 to retrieve food 28, the animal steps on the raised rear end of platform 24, which causes platform 24 to seesaw or pivot about pivot rod 26. As a result, the front end of platform 24 raises up and thereby moves lifters 36 upwardly within channels 34. Lifters 36 thereby impact against the rear ends of engagement portions 39 of levers 38, which cause levers 38 to pivot about pivot pins 40 in the direction of arrow 44. As a result, catches 42 are pivoted downwardly so as to no longer hold front door 32, as shown by the dashed line position in FIG. 5. The weight of front door 32 causes front door 32 to slide downwardly by gravity within slots 30, in order to close front opening 22 of animal trap 10 and thereby trap the animal therein.

It will therefore be appreciated that a pure mechanical linkage arrangement is provided for the trap, and there is no need for any spring loaded arrangement or the like. Further, the lever mechanism is a very simple arrangement, while still providing a strong positive hold of front door 32 in the raised position prior to activation of animal trap 10. Animal trap 10 can be made in any size, to trap mice, rats, raccoons, skunks, etc.

It will be appreciated that various modifications can be made within the scope of the present invention as claimed. For example, although two lifters 36 and two levers 38 have been shown, the present invention can also operate with only one lifter 36 and one lever 38.

Figure 6:
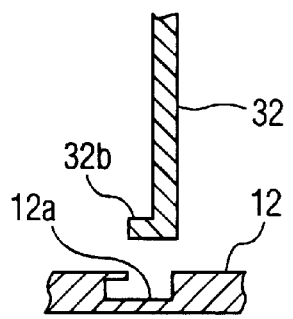
FIG. 6 is a cross-sectional view of a portion of a modified embodiment.

As an alternative embodiment, as shown in FIG. 6, the lower edge of door 32 has a forwardly extending locking flange 32b, and the upper surface of bottom wall 12 has a complementary recess 12a in alignment therewith and extending forwardly to a greater extent than the forward edge of locking flange 32b. In this manner, when an animal is trapped and pushes against door 32, locking flange 32b moves forwardly in recess 12a to lock door 32 and prevent escape.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

What is claimed is:

1. An animal trap comprising:
    a housing having:
        a bottom wall,
        at least one side wall extending vertically up from said bottom wall,
        an opening at a front of said housing,
        opposing first guides in said at least one side wall adjacent said opening, said first guides extending substantially only vertically in said at least one side wall, and
        a second guide extending substantially only vertically in said at least one side wall immediately behind one of said first guides;
    a door slidably mounted in said opposing guides for substantially only vertical movement between a raised position which permits access to said housing through said opening and a lowered position which prevents access to and egress from said housing through said opening;
    a platform pivotally positioned relative to said bottom wall;
    a lever pivotally mounted to said at least one side wall adjacent said opening, said lever having a front end with a catch for engaging a lower end of said door to hold said door in said raised position, and a rear end; and
    a lifter slidably guided by said second guide for substantially only vertical movement between said rear end of said lever and one end of said platform, such that pivotal movement of said platform when an animal steps on an opposite end of said platform causes said lifter to move vertically up in said second guide to engage said rear end of said lever so as to pivot said lever, thereby releasing said door from said catch and such that said door falls by gravity to said lowered position to prevent access to and egress from said housing through said opening.

2. An animal trap according to claim 1, wherein said first guides are formed by vertically oriented slots in said at least one side wall, and said door is slidably mounted for vertical movement in said slots.

3. An animal trap according to claim 1, wherein said second guide includes a vertically oriented channel and said lifter is slidably guided for vertical movement in said vertically oriented channel.

4. An animal trap according to claim 3, wherein there are two said second guides in opposing relation to each other, and one said lifter slidably guided for vertical movement in each said vertically oriented channel.

5. An animal trap according to claim 4, wherein there are two said levers pivotally mounted to said at least one side wall adjacent said opening in opposing relation to each other, with one lifter associated with each lever.

6. An animal trap according to claim 1, wherein said front end of said lever extends downwardly at an angle relative to said rear end of said lever.

7. An animal trap according to claim 6, wherein said catch is formed as an extension of the front end of said lever, and has an upper surface for holding said door in the raised position.

8. An animal trap according to claim 1, wherein said housing further includes a top wall.

9. An animal trap according to claim 1, wherein the lower end of said door includes a flange and said bottom wall includes a recess for receiving said flange in locking engagement when the door is closed.

10. An animal trap according to claim 9, wherein:
    said opening is providing at a front end of said animal trap,
    said flange extends in a direction at an angle from said door in a direction towards said front end, and
    said recess includes an undercut portion for receiving said flange when a force is applied by an animal on the door from inside the animal trap.

* * * * *